United States Patent Office 2,973,285
Patented Feb. 28, 1961

2,973,285

PREPARATION OF COATED ARTICLES USING GELLABLE AQUEOUS CATIONIC POLYMER COATING COMPOSITIONS AND PRINTING INKS

Eugene A. Berke, Midland, and Robert G. Jahn, Saginaw, Mich., assignors to The Dow Chemical Company, Midland, Mich., a corporation of Delaware No Drawing. Filed Dec. 31, 1958, Ser. No. 784,029

4 Claims. (Cl. 117—106)

This invention relates to the preparation of coated and/or printed articles such as paper using aqueous coating compositions and/or printing ink compositions which comprise cationic polymers as film-former and pigment binder. The invention particularly relates to means whereby the coated article can immediately and without substantial drying of the aqueous coating be handled, rolled, or stacked without sticking, offset, or deranging of the wet coating.

It is known to prepare coated or printed articles such as coated or printed paper using aqueous coating compositions or aqueous printing inks which contain colloidal dispersions of film-forming polymers, usually together with finely divided, well dispersed solid fillers and pigments. When the water is evaporated from the resulting coating, the colloidal film-forming polymer serves as binder to secure the solid particles to each other and to the base in an adherent layer.

However, prior to substantially complete drying of the coating, the wet, fluid coating is easily damaged or deranged. Such wet materials cannot be rolled, stacked together, or contacted with another material without spoiling either or both the coated surface and the contacting surface by offsetting, smearing, or sticking together. Nevertheless, it would often be convenient to be able to roll, stack, or otherwise handle such coated or printed articles while the coating or ink is still wet but without damage.

Accordingly it is an object of this invention to provide for the preparation of coated articles, including printed articles, using aqueous coating compositions whereby, without substantial drying of the aqueous coating, the coated articles can be handled and contacted with another surface with less risk of damage to either the wet coating or the contacting surface.

A particular object is to provide such articles and coating means wherein the aqueous coating composition contains a finely divided solid pigment and a colloidally dispersed film-forming polymer.

A further object is to provide such articles and coating means wherein the colloidally dispersed film-forming polymer is a cationic polymer by gelling the aqueous coating and forming a tough wet gel that is not tacky and is resistant to offsetting and sticking.

Other objects and advantages of the invention will be evident in the following description.

The objects of this invention have been attained in coated articles, including printed articles, having wet, aqueous, gelled coatings obtained by applying to the article surface a fluid aqueous coating composition, including printing ink compositions, comprising a dispersion of one or more finely divided solid materials in the nature of pigments and fillers and one or more colloidally dispersed, cationic film-forming polymers, which dispersion is stabilized and maintained solely by a cationic ammonium stabilizer of the kind hereafter defined, and contacting the fluid aqueous coating composition with an alkali to effect instant gelling of the cationic polymer dispersion and formation of a tough, non-tacky gelled layer.

Suitable starting aqueous coating compositions for the present purposes are ones wherein the polymer is film-forming. A simple and discriminative test for determining that a polymer is film-forming is carried out by casting a thin layer of the aqueous colloidal dispersion on a supporting solid surface such as a glass surface and drying the layer by evaporation of water therefrom at temperatures below 100° C. Polymers which thereby form a continuous and coherent solid film are film-forming within the meaning of the expression as herein intended.

Many such suitable film-forming polymers are already known per se which are synthetic addition polymers obtained by aqueous emulsion polymerization of ethylenically unsaturated monomers such as vinyl and vinylidene monomers. Examples of typical such ethylenically unsaturated monomers are conjugated aliphatic dienes such as 1,3-butadiene (usually referred to simply as "butadiene"), isoprene, 2,3-dimethyl-1,3-butadiene, piperylene, chloroprene, and 2,3-dichloro-1,3-butadiene; alpha-olefins such as ethylene, propylene, butene, isobutene; vinyl esters such as vinyl chloride and vinyl acetate; vinyl ethers; vinyl ketones; vinylidene chloride; vinylidene cyanide; acrylates such as acrylic and methacrylic acids, esters, nitriles, amides, and aldehydes; and styrene compounds such as styrene, vinyltoluene, $\alpha$-methylstyrene, isopropenyltoluene, divinylbenzene, ar-chlorostyrene, ar-dichlorostyrene, ar-methoxystyrene, vinylnaphthalene; vinylcarbazole, and vinyl pyridine; and drying-oil-modified polymers.

Copolymers of two or more of the above are also suitable, especially copolymers of one or more of the conjugated dienes and one or more of the monovinyl or monovinylidene compounds copolymerizable therewith, such as copolymers of butadiene and styrene, butadiene and acrylonitrile, isoprene and isobutylene; also copolymers of two or more monovinylidene compounds, e.g. vinyl chloride and vinyl acetate, vinyl chloride and vinylidene chloride, and acrylonitrile and isobutylene.

Plasticized homopolymers and plasticized resinous copolymers of kinds that are not usually film-forming except when so plasticized are also suitable, such as plasticized polystyrene aqueous dispersions and plasticized polymeric vinyltoluene aqueous dispersions.

Mixtures of polymers can also be used, e.g. a mixture of a butadiene-styrene copolymer and a butadiene-acrylonitrile copolymer, or a mixture of a butadiene-styrene copolymer and a plasticized polystyrene.

Particularly preferred pigment-binding polymer aqueous dispersions for use in accordance with this invention are film-forming latexes of butadiene polymers, styrene polymers, lower alkyl acrylate polymers, lower alkyl methacrylate polymers, styrene-butadiene copolymers, lower alkyl acrylate-methacrylate copolymers, vinyl acetate polymers, vinyl chloride polymers, and vinylidene chloride polymers.

Aqueous dispersions or "latexes" of film-forming polymers are usually prepared by emulsion polymerization in well-known ways. For the present purposes, it is necessary that the aqueous dispersion be non-alkaline and cationically stabilized solely with certain kinds of cationic ammonium stabilizers. Anionic and non-ionic stabilizers must be excluded from the compositions for the present purposes.

Cationic ammonium stabilizers already known per se for use in accordance with this invention are primary, secondary, and tertiary amine salts, tertiary amine oxides and salts thereof, salts of carboxylic acid esters of hydroxy aliphatic primary, secondary, and tertiary amines, carboxylic acid esters of hydroxy aliphatic tertiary amine oxides and salts thereof, and salts of heterocyclic nitrogenous bases having surface-active properties. Such cationic materials can be represented by the formulae:

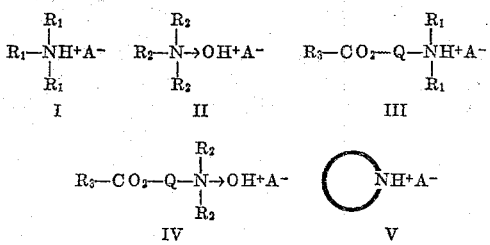

wherein at least one of the symbols $R_1$ in I, at least one of the symbols $R_2$ in II, and the symbol $R_3$ in III and IV, individually represent a hydrocarbon radical having from 8 to 20 carbon atoms or a polymeric chain, the remaining symbols $R_1$ in I and the symbols $R_1$ in III individually represent hydrogen atoms or hydrocarbon radicals having from one to 20 carbon atoms, the remaining symbols $R_2$ in II individually represent hydrocarbon radicals having from one to 20 carbon atoms, the symbol Q in III and IV represents a divalent hydrocarbon radical, the Formula V represents nitrogenous heterocyclics having from five to six atoms in a saturated or unsaturated ring which can be, for example, an aza (e.g. pyridine), diaza (e.g. imidazoline), or oxa-aza (e.g. oxazoline) ring, and wherein the symbol $A^-$ represents a simple labile anion (shown merely as having a negative charge without implying only monovalency) such as that of a mineral acid, e.g. chloride, bromide, nitrate, sulfate, or phosphate, or the anion of an organic acid, e.g. formate or acetate.

It will be observed that the foregoing formulae exclude cationic surfactants which are quatenary amines, those which are fatty acid amides, and those which are alkylene oxide condensation products of primary or secondary amines.

A preferred class of cationically stabilized polymer dispersions for the purposes of this invention includes those wherein the cationic stabilizer is polymerically combined, preferably with the film-forming polymer, and corresponds for example, to a polymer of a polymerizable ethylenically unsaturated carboxylic acid ester of a hydroxy organic amine salt, e.g. one of the group having the general formula

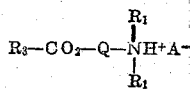

wherein the symbol $R_3$ has the special meaning of an ethylenically unsaturated hydrocarbon radical and the other symbols have meanings given above. Preferred such compounds are ones in which the carboxylic acid entity corresponds to acrylic acid or an α-substituted acrylic acid such as methacrylic acid and in which the hydroxy organic amine entity corresponds to a lower alkanolamine such as 2-aminoethanol, 2-amino-1-propanol, 3-amino-1-propanol, 2-amino-2-methyl-1-propanol, 2-amino-1-butanol, and 3-amino-2-butanol. Preferably the alkanolamine is a mono-hydroxy-mono-amino compound in which either one of the hydroxy and the amine groups can be attached to a primary, secondary, or tertiary carbon atom. The amine can be a primary, secondary, or tertiary amine, but primary amines are preferred. Examples of especially preferred polymerizable ethylenically unsaturated monocarboxylic acid esters of monohydroxy organic amine salts are mineral acid salts of 2-aminoethyl acrylate, 2-aminoethyl methacrylate, 2-aminopropyl acrylate, 2-aminopropyl methacrylate, 2-amino-1-butyl acrylate, 2-amino-1-butyl methacrylate, 2-amino-2-methylpropyl acrylate, 2-amino-2-methylpropyl methacrylate, 3-amino-2-butyl acrylate, and 3-amino-2-butyl methacrylate.

Preferably, aqueous polymer dispersions cationically stabilized with polymerically combined cationic stabilizers of the kind just described are prepared by aqueous emulsion polymerization of a monomeric composition destined to provide a colloidally dispersed film-forming polymer and including one of the afore-mentioned cationically active polymerizable ethylenically unsaturated carboxylic acid esters of a hydroxy organic amine salt as a comonomeric constituent and the sole emulsifier, i.e. without the employment of anionic or non-ionic emulsifiers. Details of such polymerizations are set forth below in connection with the specific examples.

Alternatively, the cationically stabilized aqueous polymer dispersions can be obtained by aqueous emulsion polymerization of the monomeric composition destined to provide a colloidally dispersed film-forming polymer while the monomeric composition is emulsified in an aqueous phase which contains a pre-polymerized form of one of the aforementioned cationically active polymerizable ethylenically unsaturated carboxylic acid esters of a hydroxy organic amine salt as emulsifier, again excluding anionic and non-ionic emulsifiers.

Aqueous polymer dispersions cationically stabilized with polymerically combined cationic stabilizers can also be obtained by emulsion polymerization with polymerizable ethylenically unsaturated cationic salts as comonomers or in the presence of their polymers, where the polymerizable ethylenically unsaturated cationic salt monomers can be, for example, vinylamines, vinyl tertiary amine oxides, vinylpyridines, and hydroxy alkyl-tertiary amine oxide esters of acrylic acid and α-substituted acrylic acids such as methacrylic acid.

Instead of employing as cationic emulsifier one which is a polymerizable or polymerized ethylenically unsaturated material, there can be employed a conventional cationic surfactant salt such as an 8- to 20-carbon atom alkyl amine salt, e.g. dodecyl amine hydrochloride, di-(dodecyl) amine hydrochloride, dodecyldimethyl amine hydrochloride, alkyl oxazoline hydrochlorides, alkyl imidazoline hydrochlorides, 8- to 20-carbon atom alkyl dimethyl amine oxide hydrochlorides, and fatty acid esters of aminoalcohols as hydrochloride salts, or the corresponding salts of other acids as hereinbefore set forth.

In any case, whichever kind of cationic emulsifier is used in making the cationic polymer dispersions, for the purposes of this invention, it is desirable that the compositions employ the minimum amount of such cationic agents that will provide only sufficient stability in the dispersion to permit its handling prior to gelation with alkali. While the exact amount of such cationic emulsifier depends upon its kind, the kind and concentration of polymer, and the kind and concentration of other constituents in the dispersion, in general the amount of cationic emulsifier seldom exceeds about three percent by weight of the dispersed polymer and can be only 0.5 or less percent by weight of the dispersed polymer.

In addition to the cationically stabilized film-forming polymer, the aqueous coating compositions for use in making the coated articles in accordance with this invention usually contain one or more finely divided pigment, filler, or color materials of kinds and in amounts selected for the intended purposes of the coating. Among such materials already known per se for use in aqueous polymer-binding coating compositions and suitable for use in the present compositions are non-alkaline coating grades of clay, barium sulfate, talc, titanium dioxide, carbon black, chromium oxide, and many organic colors.

As a rule, the aqueous compositions of this invention contain from 10 to 65, preferably from 25 to 60, percent by weight of total solids based on the whole composition, in which solids there is from 10 to 150 or more parts by weight of polymer binder per 100 parts by weight of pigment solids. The particular values selected within these ranges depend at least in part upon the nature of the pigment, the nature of the base article to which the coating is to be applied, the means of applying the coating, and the purpose of the coating and properties desired. For instance a suitable composition for preparing clay-coated paper contains from 10 to 25 parts by weight of polymer solids per 100 parts by weight of pigment-grade clay. A suitable printing ink composition contains from 25 to 150 parts by weight of polymer solids per 100 parts by weight of carbon black.

Other compatible additives can be included in the present compositions, bearing in mind that these compositions are neutral to acidic and are incompatible with alkaline additives. Suitable pigment dispersing agents include polyethyleneimine salts such as the hydrochloride and sulfate and polyvinyl alcohol. Suitable thickeners include polyvinyl alcohol, hydroxyethylcellulose, and starch.

In applying the aqueous coating compositions and inks to make coated articles in accordance with this invention, usual coating means and apparatus can be used. For instance, in making coated paper, coatings can be applied using air knife, reverse roll, brush, print-type, roller, trailing blade, or gravure coaters. Printing can be done by planographic, typographic, and intaglio processes. Ink compositions can also be applied through wax or other stencils. Prints can be made with blocks, rollers, or silk screens. Coatings on articles of many kinds can be made by dipping, brushing, rolling, spraying, and the like.

The coatings can be applied to the surface or surfaces of foils, sheets, or webs, or diverse shapes and articles of many kinds of material including metals such as aluminum, cellophane, paper, paperboard, glassine, rayon, asbestos, rubber, wood, plaster, cement, polyethylene, terephthalate polyester, cellulose acetate, ethylcellulose, and leather, and including woven and unwoven fabrics of cotton, wool, silk, and many kinds of synthetic fibers.

In accordance with this invention, the wet and easily damaged coating of aqueous composition comprising the specified cationic film-forming polymer is converted to less vulnerable condition by contacting the wet coating with alkali. In principle, the alkali should be of a kind and quantity to convert a substantial portion of the cationic ammonium stabilizer to a substantially non-ionized state. Suitable alkalies are ammonia, basic organic amines, and inorganic alkalies such as alkali metal hydroxides and carbonates, lime, and weak acid salts of strong alkalies. The alkali is used in amount such that at least one surface of the gelled composition is made alkaline.

In one embodiment, the gelation step of the process is advantageously carried out by exposing the wet coated or printed article to vapors of ammonia. Upon contact with ammonia, the polymer in the coating composition instantly gels, and the coating is converted to a non-fluid state in which the coating, even though still wet, is strong, non-sticky, and resistant to offset or smearing. In place of ammonia, vapors of other volatile bases can be used. Water-soluble bases can be employed in water solution and atomized or misted onto the wet coated surface to effect the gelation.

Alternatively, the alkali can be incorporated in the surface of the article prior to being coated or printed. For instance, paper can be impregnated or pre-coated with an alkaline material such as an alkali-metal or alkaline earth-metal carbonate. When the herein specified coating compositions or inks are applied to such alkali-containing surfaces, the coatings are instantly gelled and set.

The application of the gellable pigmented coating compositions to surfaces which contain alkali necessary for gelation is especially advantageous when the article is a highly porous or absorbent one, such as coarse felts, textiles, fibrous bagasse boards and the like which normally tend to absorb large quantities of aqueous dispersions. In accordance with the present invention, alkali in and at the article surface causes gelation of the coating at the surface of the article and provides excellent "hold-out" of the coating pigment and binder.

The temperature at which the alkali gelation is carried out is not critical and can conveniently be approximately room temperature.

As indicated hereinbefore, such gelled coatings, even though still wet, are strong, non-sticky, and resistant to offset or smearing. After gelling, the coatings can be dried by evaporation of water, with or without heat, in the usual manner. Thereafter, the dried coating can be further treated, if desired, by conventional procedures such as calendering, varnishing, and the like.

The process of the invention is particularly advantageous in the preparation of coated paper. While paper coatings can be applied either on or off the paper machine, the new process permits on-machine preparation of coatings with characteristics that hitherto were obtainable only off-machine.

In the coating of paper on-machine, the coated paper after gelation of the coating can be run with the wet coated surface in contact with turning rolls or drying drums without damage, thereby eliminating need for the infra-red and like setting devices now commonly used. Heavy coatings can be obtained by applying a plurality of layers of the same or different coating composition successively to the paper web with gelation with alkali between successive coats but with only one drying step after the multiple coating is complete. In some instances, the alkali applied to gel one coating layer renders the coated surface sufficiently alkaline to gel the next applied layer of coating material without further application of alkali thereto.

Cast coatings can readily be obtained on webs such as paper by bringing the wet gelled coating in known manner into contact with a highly polished and heated surface such as that of a metal casting drum or belt and evaporating the water from the coating through the back of the web.

The compositions and gelling step of the present process are further advantageous particularly in paper coating in that the pigment particles and polymer constituent are held in more uniform distribution in the coating. In the usual process of coating with pigmented aqueous colloidal polymer, absorbent subtrates such as paper act as filter media causing some extraction of the colloidal polymer from the pigment, and the final surface may be "starved" for polymer unless compensating correction is made in the starting composition. In accordance with the present process, the gelled polymer is uniformly held through the thickness of the coating. Consequently, higher quality coatings are obtained in the present process or, alternatively, comparable coatings can be obtained from starting compositions having a lower initial polymer content.

The following examples illustrate the invention but are not to be construed as limiting its scope.

*Example 1*

A paper-coating composition was prepared as follows:

| Ingredient | Composition in Parts by Weight | |
| --- | --- | --- |
| | Dry Basis | Wet Basis |
| Coating-grade clay, dispersion in water | 100 | 154 |
| Polymer colloidal dispersion | 20 | 40.2 |
| Water to 55 percent total solids | | 24 |

The polymer colloidal dispersion was an acidic, cationically stabilized, film-forming polymer latex. The film-forming property was ascertained by a preliminary test in which a thin layer of the latex was cast on a flat glass plate and dried by evaporation of water to obtain a dry, continuous, coherent solid polymer film.

The acidic, cationically stabilized, film-forming polymer aqueous dispersion was prepared as follows:

A polymerization vessel was charged with equal parts of a monomeric portion and an aqueous portion having the following compositions in parts by weight:

| Monomer portion: | Parts |
|---|---|
| Styrene | 60 |
| 1,3-butadiene | 40 |
| Total | 100 |

| Aqueous portion: | |
|---|---|
| 2-aminoethyl methacrylate·HCl parts | 0.7 |
| $H_2O_2$ (100 percent basis) do | 0.6 |
| Ferric ion, added as $Fe(NO_3)_3 \cdot 9H_2O$ parts | 0.0002 |
| Hydrochloric acid | to pH2 |
| Water | Balance |
| Total parts | 100 |

The charge was closed in the polymerization vessel and heated with agitation in a water-bath at 70° C. until the polymerization was substantially complete.

The resulting stable colloidal dispersion was steam distilled to obtain an acidic dispersion containing approximately 49.7 percent by weight of non-volatile solids, and a portion was used to prepare the pigmented paper-coating as described above.

A thin layer of the resulting pigmented paper-coating composition was applied to a sheet of ordinary paper and, while still wet, the coating layer was exposed to vapors of ammonia from concentrated aqua ammonia. The coating instantly gelled on the paper to a condition which, though still wet, was resistant to offset, sticking and like damage. The coating was dried in the usual manner by evaporation of water to produce an excellent grade of polymer-bound clay-coated paper.

*Example 2*

From another portion of the acidic, cationically stabilized, film-forming colloidal polymer aqueous dispersion described in Example 1 there was prepared a printing ink as follows:

| Ingredient | Composition in Parts by Weight | |
|---|---|---|
| | Dry Basis | Wet Basis |
| Carbon Black Pigment, dispersion in water | 50 | 100 |
| Polymer colloidal dispersion | 50 | 100.4 |

The resulting ink composition was used for printing with conventional printers' type on paper. While the ink was still wet, the printed paper was exposed to vapors of ammonia. Thereupon the ink instantly gelled and, although still wet, was resistant to offset and smearing. The ink printing was then dried in usual manner by evaporation of water.

*Example 3*

The polymer-clay coating composition described in Example 1 and the polymer-carbon black printing ink described in Example 2 were used to coat and to print, respectively, on aluminum foil, on cellophane, on boxboard, on glassine, on polyethylene, and on a terephthalic acid polyester film. In each instance, exposure to ammonia vapors caused instant gelation of the wet coating or ink and rendered the same resistant to damage by handling, stacking, and like operations. After drying by evaporation of water, the coatings and ink print became strongly bonded to the solid base.

In place of the paper-coating clay used in Example 1, there can be used other of the well-known kinds of finely divided, water-dispersible solid pigments, colors, and fillers as previously described to obtain corresponding pigmented polymer coating compositions which when laid in a layer on paper or other base are instantly gelled by contact with alkali in accordance with this invention.

In place of the particular polymer dispersion used in Examples 1-3, there can be used another neutral to acidic film-forming pigment-binding dispersion stabilized by the cationic ammonium stabilizers as herein specified with substantially the same results. For instance, polymer dispersions prepared in accordance with the succeeding Examples 4, 5, and 6 are compounded with pigments and fillers to provide coating compositions and printing inks which are gelled by contact with alkali in accordance with this invention.

*Example 4*

An acidic aqueous dispersion of a cationically stabilized colloidal film-forming polymer was prepared as follows:

Six parts by weight of n-butyl acrylate were dispersed into 100 parts by weight of an aqueous composition containing, in parts by weight:

| 2-aminoethyl methacrylate·HCl parts | 0.6 |
|---|---|
| $H_2O_2$ (100 percent basis) do | 0.6 |
| Ferric ion, added as $Fe(NO_3)_3 \cdot 9H_2O$ do | 0.0001 |
| Hydrochloric acid | To pH2 |
| Water | Balance |
| Total parts | 100 |

The dispersion was heated with agitation in a closed vessel in a hot-water bath at 70° C. until the polymerization was substantially complete, whereupon the following further monomers were charged to the polymerization mixture in a continuous manner over a period of 1.25 hours:

| | Parts |
|---|---|
| Ethyl acrylate | 63 |
| Methyl methacrylate | 31 |
| Total | 94 |

The resulting mixture was closed in the polymerization vessel and heated with agitation in the hot water bath at 70° C. until the polymerization was substantially completed.

There was thereby obtained an acidic aqueous dispersion of a cationically stabilized colloidal polymer which was film-forming as shown by the following preliminary test. A thin layer of the dispersion was cast on a flat glass plate and dried by evaporation of water, forming a continuous and coherent dry polymer film.

*Example 5*

The following composition was charged to a polymerization vessel (parts by weight):

| Styrene parts | 60 |
|---|---|
| 1,3-butadiene do | 40 |
| Dodecyldimethylamine oxide do | 3 |
| $H_2O_2$ (100 percent basis) do | 1.5 |
| $Fe^{+3}$ (as $Fe(NO_3)_3 \cdot 9H_2O$) do | 0.001 |
| Nitric acid | To pH2 |
| Water | Balance |
| Total parts | 200 |

The vessel was closed and the mixture was heated with agitation at 70° C. in a water bath until polymerization was substantially completed.

*Example 6*

The polymerization procedure described in Example 5 was substantially repeated with a polymerization charge corresponding to the one therein described except that the 3 parts by weight of dodecyldimethylamine oxide was replaced with one part of dodecylamine hydrochloride.

What is claimed is:

1. In a process for preparing coated articles by applying to a surface thereof a layer of a composition which is an aqueous dispersion of a finely divided solid pigment and a film-forming pigment-binding polymer and subsequently drying the coating by evaporation of water, the improvement which comprises applying to the article surface a layer of a non-alkaline, fluid, aqueous dispersion containing from 10 to 65 percent by weight of dispersed solid matter including finely divided pigmentary material and film-forming polymer in amounts corresponding to from 10 to 150 parts by weight of the film-forming polymer per 100 parts by weight of the pigmentary material, wherein the polymer is an addition polymer of ethylenically unsaturated monomers and the dispersion is stabilized solely by a cationic non-quaternary salt of an ammonium compound having surfactant properties and selected from the group consisting of amines, tertiary amine oxides, carboxylic acid esters of hydroxy aliphatic amines, carboxylic acid esters of hydroxy aliphatic tertiary amine oxides, and heterocyclic nitrogenous bases, in which dispersion the cationic ammonium compound stabilizer is from 0.5 to 3 percent by weight of the colloidally dispersed polymer, and contacting the fluid coating layer with an alkali in amount to effect gelling of the dispersion, whereby the gelled wet coating layer is resistant to derangement and offset.

2. The improvement according to claim 1 wherein the alkali is gaseous ammonia.

3. The improvement according to claim 1 wherein the article has a surface of paper and the aqueous dispersion is a paper-coating composition containing from 25 to 60 percent by weight of dispersed solid matter including paper-coating pigmentary material and the film-forming polymer in amounts corresponding from 10 to 25 parts by weight of the film-forming polymer per 100 parts by weight of the paper-coating pigmentary material.

4. The improvement according to claim 1 wherein the aqueous dispersion has the characteristics of a printing ink and contains from 25 to 60 percent by weight of dispersed solid matter including ink pigment and film-forming polymer in amounts corresponding to from 25 to 150 parts by weight of the film-forming polymer per 100 parts by weight of the ink pigment.

References Cited in the file of this patent

UNITED STATES PATENTS

| | | |
|---|---|---|
| 2,710,815 | Young et al. | June 14, 1955 |
| 2,803,171 | Cubberley et al. | Aug. 20, 1957 |
| 2,828,223 | McWherter et al. | Mar. 25, 1958 |
| 2,883,304 | Kine et al. | Apr. 21, 1959 |
| 2,886,474 | Kine et al. | May 12, 1959 |